United States Patent [19]

Moody et al.

[11] Patent Number: 5,560,441
[45] Date of Patent: Oct. 1, 1996

[54] WINCH FOR SNOWMOBILES

[76] Inventors: Larry Moody; Kevin S. Wilson, both of 702 Union St., Boise, Id. 83702

[21] Appl. No.: 473,710

[22] Filed: Jun. 7, 1995

[51] Int. Cl.$^6$ .................................................. B62D 57/00
[52] U.S. Cl. ............................................ 180/7.5; 254/265
[58] Field of Search .......................... 180/7.1, 7.5, 9.32; 254/264, 265317, 48

[56] References Cited

U.S. PATENT DOCUMENTS

| | | | |
|---|---|---|---|
| 2,479,748 | 8/1949 | Lassila | 180/7.5 X |
| 2,744,690 | 5/1956 | McClain | 180/7.5 X |
| 3,278,159 | 10/1966 | Jack | 180/7.5 |
| 4,778,126 | 10/1988 | Spann, Jr. | 180/7.5 X |

*Primary Examiner*—Kevin Hurley
*Attorney, Agent, or Firm*—Craig Korfanta

[57] ABSTRACT

A winch device for snowmobiles, having a tensile member (34) and a centering harness (36), with tensile member (34) being configured to be removably attached to the track (24) of a snowmobile and centering harness (36) being configured to be removably attached to the front end of the snowmobile. In use, the centering harness provides support for a guide (38) that receives and guides tensile member (34). One end of tensile member (34) attaches to a track (24), and the other end attaches to some solid and secure object. When power is applied to the snowmobile, track (24) rotates, thereby propelling the snowmobile forward along the length of tensile member (34) and toward the solid and secure object to which the tensile member is attached.

23 Claims, 6 Drawing Sheets

WINCH FOR SNOWMOBILES

BACKGROUND OF THE INVENTION

1. Technical Field

This invention relates to winches for snowmobiles and other track-driven snow vehicles, particularly to a winch that harnesses the power of a snowmobile's engine to close the relative distance between the snowmobile and some other object, as when attempting to free the snowmobile after it has become stuck in soft snow.

2. Background

Under ordinary conditions, a snowmobile propels itself forward by means of a rotating track, with the weight of the snowmobile supported by the snow over which it travels. On hard-packed snow, such as the snow found on a groomed trail, the rotating track easily gains sufficient traction to propel the snowmobile forward. However, in soft snow the rotating track may begin to dig into the snow, sinking the rear end of the snowmobile and slowing its forward progress. As the snowmobiler applies more power to the engine, the rotating track digs itself further into the snow, until the snowmobile's forward progress is arrested and the snowmobile is firmly mired in the snow. When snowmobilers become stuck in this fashion, as they frequently do, they usually resort to one of the following four methods to free the stuck snowmobile: repositioning the snowmobile; tramping a trail; using a portable, hand-operated winch, commonly known as a cable hoist/puller; or using an electrically operated winch.

Each of these methods is described below, along with the disadvantages and limitations of each.

The first method to free a stuck snowmobile is simply to reposition it. Repositioning the snowmobile is the most common and most basic of the four methods. After miring a snowmobile in soft snow, the snowmobiler grasps the lift bar at the rear of the snowmobile and then lifts the rear end of the snowmobile up and out of the snow, repositioning the track a few inches to the left or right of its previous position. The snowmobiler then grasps the lift bar at the front of the snowmobile and lifts the front end up and out of the snow, repositioning the front end a few inches to the left or right of its previous position. In most instances, the snowmobiler must also reposition the skis of the snowmobile to align them with the snowmobile's new position. To lift the snowmobile and reposition the skis, the snowmobiler must often use his or her hands and feet to dig in the snow, in order to make room for the repositioned snowmobile and to provide a firm surface on which the track can gain traction.

The disadvantages and limitations of this method are described below.

The method is time-consuming. Quite often, the snowmobiler must move the front and rear end of the snowmobile to a variety of new locations, repositioning the snowmobile's skis each time, before the snowmobile can gain sufficient traction to propel itself forward.

The method is laborious. Because a typical snowmobile weighs upwards of 400 pounds, repositioning it requires substantial physical strength. For snowmobilers who lack the necessary physical strength, the method is of no use.

The method can quickly tire even those snowmobilers who are in good physical condition. In addition, the exertion required by this method—and the resultant fatigue—increases the likelihood that the snowmobiler will suffer from hypothermia, subnormal temperature of the body.

The method requires that the snowmobiler spend a considerable amount of time digging in the snow and walking through the snow, increasing the likelihood that the snowmobiler will suffer from frostbite or hypothermia.

In spite of the snowmobiler's best efforts, the repositioning may not free the snowmobile. Because the snowmobile is usually surrounded by soft snow, repositioning may simply allow the snowmobile to dig itself in once more, this time in a new location.

Another common method of freeing a stuck snowmobile is for the snowmobiler to tramp a trail in the soft snow. The snowmobiler wades back and forth through the snow that lies between the stuck snowmobile and some firm surface, such as a groomed trail, tramping down the soft snow to create a trail. If the snow along the tramped trail is sufficiently compacted, the snowmobile may be able to proceed on its own power.

The disadvantages and limitations of this method are described below.

The method is time-consuming and laborious, requiring substantial physical strength and good physical condition on the part of the snowmobiler.

The method can quickly tire even those snowmobilers who are in good physical condition. In addition, the exertion required by this method—and the resultant fatigue—increases the likelihood that the snowmobiler will suffer from hypothermia.

The method requires that the snowmobiler spend a considerable amount of time digging in the snow and walking through the snow, increasing the likelihood that the snowmobiler will suffer from frostbite or hypothermia.

Once the snowmobiler has tramped the trail through the snow, the snowmobiler must use physical strength alone to pull the machine forward onto the tramped trail. Pulling the snowmobile forward requires substantial physical strength; for snowmobilers lacking this physical strength, the method is of no use.

Finally, this method works only if the snow in the tramped trail is compacted enough to support the weight of the snowmobile and thus allow its track to gain traction.

A third method for freeing a stuck snowmobile is to use a portable, hand-held winch. Among their gear, some snowmobilers carry a portable, hand-operated winch, commonly known as a cable hoist/puller. Through a combination of physical and mechanical power, the hand-operated winch can be used to free a stuck snowmobile. To use the portable, hand-operated winch, the snowmobiler first attaches the winch to the snowmobile by means of a hook attached to one end of the winch. A similar hook, located at the end of the winch's steel cable, enables the snowmobiler to attach the cable to a tree, a tree stump, a fence post, another snowmobile, or some other solid and secure object. A lever located on the frame of the winch transfers the snowmobiler's physical power to a set of gears encased in the frame. As the snowmobiler works the lever back and forth, the gears turn. As the gears turn, the cable winds around a spool, pulling the snowmobile forward.

The disadvantages and limitations of using a typical hand-held winch are described below.

Using a typical hand-held winch can be as time-consuming as repositioning the snowmobile or tramping a trail. In addition, using a typical hand-held winch requires that the snowmobiler possess sufficient physical strength to operate the lever on the winch. Depending on the size of the hand-held winch and the weight of the snowmobile, the snowmobiler may find that he or she is unable to exert enough pressure on the lever to pull the snowmobile forward.

A typical hand-held winch weighs between 4.5 kg and 6.8 kg, adding significantly to the weight of the snowmobile and thereby negatively affecting the snowmobile's performance, handling, and stability.

The cable on a typical hand-held winch is 3.7 m long, limiting the number of situations and the variety of situations in which it can be used effectively. Because it is a fairly complex piece of equipment, a typical hand-held winch is subject to mechanical breakdowns and failure of its individual parts. Because it is a fairly complex piece of equipment, a typical hand-held winch requires some maintenance, primarily regular cleaning and oiling, to ensure that it operates properly and reliably.

A typical hand-held winch measures 61 cm L by 7.6 cm W by 7.6 cm H. As such, it is too large to fit into a snowmobile's trunk, the storage area located in the rear of the seat. On some snowmobiles, a typical hand-held winch may fit in a storage area located under the seat; however, very few snowmobiles have a storage area under the seat. In addition, a typical hand-held winch is too large to be carried in standard saddlebags. Finally, the bulk of the hand-held winch reduces a snowmobiler's ability to carry other gear, including such commonly carried items as extra clothing, food, and survival equipment.

To overcome some of the disadvantages and limitations of the three methods described above, some snowmobilers have mounted to their snowmobiles an electrically powered winch, of the sort occasionally found on three- and four-wheeled all-terrain vehicles (ATVs). Operating on similar principles as does a hand-held winch, an electrically powered winch enables the snowmobiler to attach a steel cable to a tree, a tree stump, a fence post, another snowmobile, or some other solid and secure object, and then use the winch's power to pull the snowmobile forward a few feet.

The disadvantages and limitations of using a typical electrically powered winch are described below.

A typical winch of this sort weighs between 6.8 kg and 9 kg, adding significantly to the weight of the snowmobile and thereby negatively affecting the snowmobile's performance, handling, and stability.

Because most snowmobiles are not designed to carry a battery, a battery to power the winch must be added to the snowmobile. A typical battery weighs between 1 kg and 1.4 kg, adding significantly to the weight of the snowmobile and thereby negatively affecting the snowmobile's performance, handling, and stability.

Because most snowmobiles are not designed to carry a battery, a snowmobiler wishing to use an electrically powered winch must fabricate a battery mounting bracket in the engine compartment. Installing a typical battery, which measures 20 cm L by 13 cm W by 18 cm H, reduces the snowmobiler's ability to carry other gear, including such commonly carried items as spare parts and tools.

Because snowmobiles are not designed to carry electric winches, the snowmobiler must either fabricate a mounting bracket or purchase a mounting bracket designed for an ATV. In either case, attaching the winch to the snowmobile requires a high degree of mechanical skill. In addition, fabricating a mounting bracket or modifying an ATV bracket can lead to some loss of the snowmobile's performance, handling, and stability, depending on how the bracket is fabricated and how it is attached to the snowmobile.

Electrically powered winches are highly dangerous. A typical electrically powered winch has a working load of up to 499 kg. Generating enough force to pull 499 kg places considerable strain on the winch's steel cable and on any hardware attached to the cable. If the cable or the hardware breaks, the cable or the hardware can come flying back toward the snowmobiler at a high rate of speed. The snowmobiler can reduce the danger of using an electrically powered winch by operating the winch with a hand-held remote-control unit, which enables the snowmobiler to stand some distance from the electrically powered winch. Of course, the remote-control unit adds to the weight of the snowmobile and also reduces the snowmobiler's ability to carry additional gear.

The cable on a typical electrically powered winch is 7.6 m long, limiting the number of situations and the variety of situations in which it can be used effectively. Because it is a highly complex piece of equipment, a typical electrically powered winch is subject to mechanical breakdowns, electrical shorts, and failure of its individual parts. Because it is a highly complex piece of equipment, a typical electrically powered winch requires considerable maintenance to ensure that it operates properly and reliably.

SUMMARY OF THE INVENTION

Accordingly, it is one object of the invention to provide a winch that can be used to free a snowmobile stuck in soft snow, using no power source other than that provided by the snowmobile itself.

Another object of the invention is to provide a method of freeing a stuck snowmobile that requires less physical strength and less physical exertion than either repositioning the snowmobile or tramping a trail.

A further object of the invention is to provide a method of freeing a stuck snowmobile that requires the snowmobiler to spend less time digging in the snow or walking in the snow than if the snowmobiler were to reposition the snowmobile or tramp a trail.

A further object of the invention is to provide a method of freeing a stuck snowmobile that is less time-consuming than repositioning the snowmobile or tramping a trail.

A further object of the invention is to provide a method of freeing a stuck snowmobile that is more effective, efficient, and reliable than repositioning the snowmobile or tramping a trail.

A further object of the invention is to provide a winch lighter in weight than either a typical hand-held winch or a typical electrically powered winch.

A further object of the invention is to provide a winch the dimensions of which make it easier to store and carry on a snowmobile than it is to store and carry a typical hand-held winch.

A further object of the invention is to provide a winch with a working length greater than that of a typical hand-held winch or of a typical electrically powered winch.

A further object of the invention is to provide a winch that requires no mounting bracket and no modifications to the snowmobile, unlike a typical electrically powered winch.

A further object of the invention is to provide a winch that requires little or no maintenance, unlike a typical hand-held winch or a typical electrically powered winch.

A further object of the invention is to provide a winch that is safer to use than a typical electrically powered winch, by eliminating or reducing some or all of the safety hazards associated with electrically powered winches.

A further object of the invention is to provide a winch that requires less physical strength on the part of the snowmobiler than does repositioning the snowmobile, or in some cases, using a typical hand-held winch.

A further object of the invention is to provide a winch that requires little mechanical skill on the part of the snowmobiler.

A further object of the invention is to provide a winch that can be used to hoist or lift a load, using no power source other than that provided by the snowmobile itself.

A further object of the invention is to provide a winch that can be used to drag or pull a load, using no power source other than that provided by the snowmobile itself.

These objects, as well as others, are satisfied by a winch device that generally includes a tensile member and a centering harness. The tensile member has means by which it may be removably attached to the track of a snowmobile, while the centering harness has means by which it may be removably attached to the front end of the snowmobile.

To winch a snowmobile from soft snow, a snowmobiler first attaches the centering harness to the front of the snowmobile. Then, the snowmobiler feeds one end of the tensile member through the centering harness and attaches the tensile member to the track of the snowmobile. After anchoring the opposite end of the tensile member to a tree, a tree stump, a fence post, another snowmobile, or some other solid and secure object, the snowmobiler applies power to the snowmobile.

As the snowmobiler applies power, the track of the snowmobile begins to rotate. Because the tensile member is attached to the track at one end, and to a solid and secure object at the other end, the rotation of the track propels the snowmobile forward. In essence, the snowmobile crawls along the tensile member, with the centering harness guiding the tensile member along the center of the track as the tensile member wraps around the track.

To use the winch to hoist a load, the snowmobiler first attaches one end of the tensile member to the load and then passes the tensile member over an elevated fulcrum point, such as a tree limb. Next, the snowmobiler attaches the other end of the tensile member to the track of the snowmobile, near the rear of the snowmobile. As the snowmobiler drives away from the load, the tensile member wraps around the track, distributing the weight of the load throughout the track. Alternatively, the snowmobiler could elevate the rear of the track so that it turns freely; with this method, the snowmobile remains stationary while the tensile member winds around the rotating track, lifting the load.

To use the winch to drag a load toward the snowmobile, the snowmobiler first attaches one end of the tensile member to the load and then attaches the other end of the tensile member to the track of the snowmobile, near the rear of the snowmobile. As the snowmobiler drives away from the load, the tensile member wraps around the track, pulling the load toward the snowmobile. Again, the weight of the load is distributed evenly throughout the track, and the load is retrieved at a greater rate of travel than if the tensile member were simply attached to the body of the snowmobile. Alternatively, the snowmobiler could elevate the rear of the track so that it turns freely. With this method, the snowmobiler first attaches the tensile member to the load, and then passes the other end of the tensile member through the centering harness. After attaching the tensile member to the track, the snowmobiler applies power to wind the tensile member around the freely rotating track.

Additional objects, advantages, and novel features of the invention will be set forth in part in the description that follows, and in part will become apparent to those skilled in the art upon examination of the following or may be learned by practice of the invention. The objects and advantages of the invention may be realized and attained by means of the instrumentalities and combinations particularly pointed out in the appended claims.

DETAILED DESCRIPTION OF THE INVENTION

Figure 1:
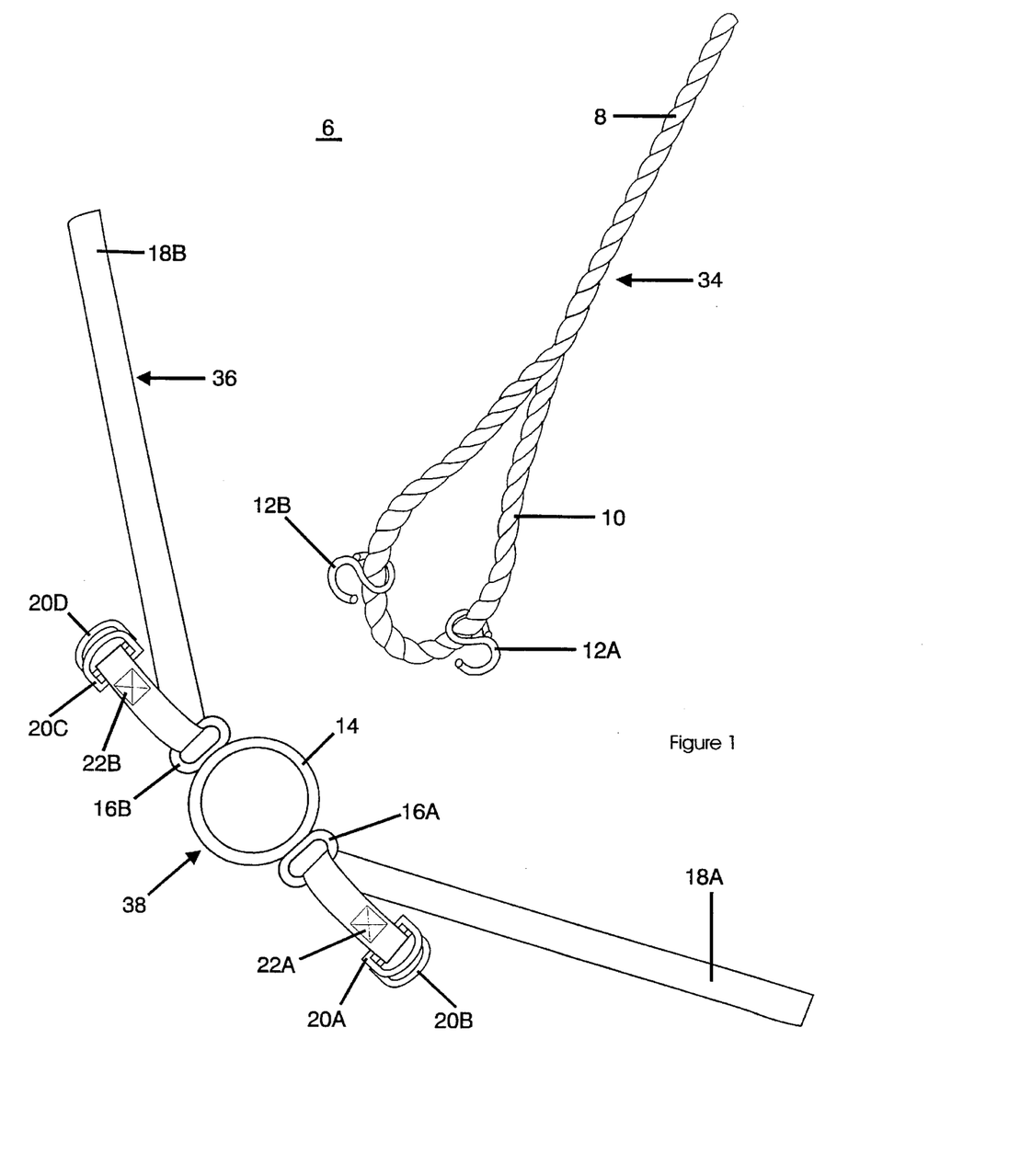
FIG. 1 is a representational view showing the preferred embodiment of a winch for snowmobiles according to the invention.

Referring now to the figures, FIG. 1 shows the preferred embodiment of winch 6, which includes a tensile member 34 and a centering harness or centering device 36. Here, tensile member 34 consists of a 15.2-meter polyester nylon rope 8 terminating in a loop 10, which is spliced into rope 8 by weaving the individual strands of rope 8 and which measures 38 cm at its fullest extension.

Attached to loop 10 are S-hooks 12A and 12B, both of 0.63-cm hardened steel wire and both measuring 6 cm H by 3.2 cm W. One end of S-hook 12A and one end of S-hook 12B bends around loop 10 so that both S-hooks 12A and 12B are securely attached to loop 10.

A centering guide 38 is provided, here an O-ring 14 of 0.63-cm hardened steel wire, measuring 3.8 cm inside diameter, having a pair of O-ring ears 16A and 16B welded thereto. Both O-ring ears 16A and 16B are made of 0.48-cm hardened steel wire, and both measure 3.2 cm H by 1.9 cm W.

Looped through O-ring ear 16A is a strap 18A of 1.9-cm nylon webbing, measuring 1.5 m in length. Likewise, looped through O-ring ear 16B is a strap 18B of 1.9-cm nylon webbing, also measuring 1.5 m in length. Attached to strap 18A is a D-ring 20A and a D-ring 20B, both of hardened 0.48-cm steel wire. Likewise, attached to strap 18B is a D-ring 20C and a D-ring 20D, both of 0.48-cm hardened steel wire. Each straight member of D-rings 20A, 20B, 20C, and 20D measures 3.8 cm in length, while each curved portion measures 3.2 cm from the apex of the curved portion to the far edge of the straight portion.

D-rings 20A and 20B attach to strap 18A as follows: strap 18A loops around the straight portion of D-rings 20A and 20B and back upon itself; and a box stitch 22A, sewn into strap 18A and measuring 1.6 cm L by 1.6 cm W, closes off the loop created in strap 18A and thus secures D-ring 20A and D-ring 20B to strap 18A, as best seen in FIG. 1. D-rings 20C and 20D likewise attach to strap 18B, as follows: strap 18B loops around the straight portion of D-rings 20C and 20B and back upon itself; and a box stitch 22B, sewn into strap 18B and measuring 1.6 cm L by 1.6 cm W, closes off the loop created in strap 18B and thus secures D-ring 20C and D-ring 20D to strap 18B, as best seen in FIG. 1.

In the preferred embodiment, rope 8 is a 15.2-meter rope of polyester nylon, consisting of a core and a jacket of three strands woven around the core. However, it should be noted that rope 8 can be a hollow-core or other type of rope and can consist of any material strong enough to withstand the pressures created by using winch 6, including such materials as nylon webbing, steel rope, chain, or metal cable. In addition, rope 8 can be of any length sufficient to allow winch 6 to function as intended.

Though the preferred embodiment is to create loop 10 in rope 8 by weaving or splicing the individual strands of rope 8, loop 10 can be created in rope 8 by a variety of other methods, including sewing, whipping, or by joining one end of rope 8 to the body of rope 8 with clamps, hog rings, metal banding, or other hardware. Also, in the preferred embodiment, loop 10 measures 38 cm when stretched to its full extension; however, loop 10 can be formed in a variety of sizes other than the preferred size of 38 cm. Finally, loop 10 can be replaced by a variety of hardware attached to rope 8; such hardware might include carabiners, quick links, and O-rings, each of which could be fashioned from a variety of materials, including metal, rigid rubber, and high-impact plastic.

In the preferred embodiment, S-hooks 12A and 12B are standard S-hooks of 0.63-cm hardened steel wire, each measuring 6 cm H by 3.2 cm W. However, S-hooks 12A and 12B can consist of any material strong enough to withstand the pressures exerted by using winch 6 and can be a variety of sizes. In addition, S-hooks 12A and 12B can be formed in a variety of shapes; for instance, S-hooks 12A and 12B can each be replaced with a standard eye-hook (an S-hook with one end completely closed) or by a variety of specially fabricated hardware.

In the preferred embodiment, O-ring 14 is a standard O-ring; that is, it is a circular loop of 0.63-cm hardened steel wire, formed when the two ends of the wire are welded to each other and measuring 3.2 cm inside diameter. However, O-ring 14 can be fashioned from a variety of materials, including high-impact plastic and metals other than steel, and O-ring 14 can be a variety of sizes. Likewise, the material of O-ring 14 can be stamped, forged, or molded, rather than welded, to form the loop. Finally, O-ring 14 can be fashioned in a variety of shapes; for instance, O-ring 14 could be fashioned as a square, an oval, a triangle, a rectangle, a funnel, or some combination of these basic shapes.

In the preferred embodiment, O-ring ear 16A and O-ring ear 16B each consist of a single link from standard chain of 0.48-cm hardened steel wire, with the two ends of the wire welded to each other to form an oval loop. However, O-ring ears 16A and 16B can be fashioned from a variety of materials, including high-impact plastic and metals other than steel, and O-ring ears 16A and 16B can be a variety of sizes. Likewise, the material of O-ring ears 16A and 16B can be stamped, forged, or molded, rather than welded, to form the loop. In addition, O-ring ears 16A and 16B can be fashioned in a variety of shapes; for instance, O-ring ears 16A and 16B could each be fashioned as a square, a circle, a triangle, a rectangle, or some combination of these basic shapes.

In the preferred embodiment, O-ring ears 16A and 16B are welded to O-ring 14. However, O-ring ears 16A and 16B could be clamped to O-ring 14. In addition, the combination of O-ring ear 16A, O-ring ear 16B, and O-ring 14 can be stamped, forged, or molded as a single piece, again from a variety of materials, including high-impact plastic and metals other than steel.

In the preferred embodiment, straps 18A and 18B consist of a 1.5-meter length of 1.9-cm nylon webbing, of the sort typically used for motorcycle tie-downs and as closures on backpacks and soft-sided luggage. However, straps 18A and 18B can be fashioned from a variety of materials, including such materials as leather, cloth, rope, or metal chain. In the preferred embodiment, D-rings 20A, 20B, 20C, and 20D are standard D-rings of 0.48-cm hardened steel wire, with the two ends of the wire bent and then welded to each other to form a D-shaped loop. However, D-rings 20A, 20B, 20C, and 20D can be fashioned from a variety of materials, including high-impact plastic and metals other than steel. Likewise, D-rings 20A, 20B, 20C, and 20D can be stamped, forged, or molded, rather than welded, to form the loop.

In the preferred embodiment, each straight member of D-rings 20A, 20B, 20C, and 20D measures 3.8 cm in length, while each curved portion measures 3.2 cm from the apex of the curved portion to the far edge of the straight portion. However, D-rings in a variety of sizes can be substituted. In addition, other standard fastening hardware can be substituted for D-rings 20A, 20B, 20C, and 20D; among the hardware that could be substituted are metal or plastic loops of the sort commonly found on the straps of camera cases, backpacks, and soft-sided luggage, or quick-release, molded-plastic buckles of the sort typically found on the straps of motorcycle helmets.

Finally, in the preferred embodiment D-rings 20A and 20B attach to strap 18A by means of strap A looping around the straight portion of D-rings 20A and 20B and then looping back upon itself. A box stitch 22A, sewn into strap 18A, closes off the loop thus created in strap 18A and thereby secures D-ring 20A and D-ring 20B. The same is true for strap 18B and D-rings 20C and 20D. Other methods of attaching the D-rings can used, including such methods as substituting rivets for box stitch 22A and box stitch 22B or using stitching in a pattern different from that shown in FIG. 1.

From the physical description above, a number of physical advantages of winch 6 should become evident, including those described below.

At approximately 1.8 kg, winch 6 is significantly lighter than either a typical hand-held winch (4.5 kg to 6.8 kg) or a typical electrically powered winch (6.8 kg to 9 kg), primarily because winch 6 is manufactured from relatively lightweight materials and contains only a few parts. Because snowmobilers are constantly striving to reduce the weight of their snowmobiles in order to improve performance, stability, handling, and gas mileage, the low weight of winch 6 offers substantial benefits.

In addition, with tensile member 34 and centering harness 36 tightly coiled, winch 6 has an overall volume of 549 cm$^3$. As such, winch 6 has an overall volume no greater than that of a typical hand-held winch. More importantly, winch 6 forms a somewhat malleable package, because tensile member 34 and centering harness 36 can be coiled, wrapped, or twisted to form a variety of shapes. In this respect, winch 6 is far easier to store and carry on a snowmobile than is a typical hand-held winch, which is constructed of rigid metal.

The small size of winch 6 enables a snowmobiler to store and carry it either in the trunk of the snowmobile, in the underseat storage area of the snowmobile, in a backpack, or in standard saddlebags. With a typical hand-held winch, the snowmobiler must store and carry the winch either in the underseat storage area (unavailable on most snowmobiles) or must strap the winch to the body of the snowmobile, a potentially dangerous practice, for the winch can become entangled in the moving parts of the snowmobile or can come loose and strike another snowmobiler or onlookers.

Because rope 8 is 15.2 m long, winch 6 can be used in a greater number of situations and in a wider variety of situations than is the case with either a typical hand-held winch or a typical electrically operated winch, which have steel cables measuring 3.7 m and 7.6 m, respectively. The longer working length of winch 6 provides greater flexibility and versatility of use than does a typical hand-held winch or a typical electrically powered winch, particularly if a snowmobiler has become stuck far from a groomed trail or other packed surface.

Because winch 6 is designed to be self-sufficient and to be carried on the snowmobile, it requires no mounting bracket and no modifications to the snowmobile, as is the case with a typical electrically powered winch.

Finally, because winch 6 is constructed of simple, water-resistant materials and contains no moving parts, it requires little or no maintenance, unlike a typical hand-held winch or a typical electrically powered winch, both of which are complex pieces of equipment with many moving parts.

Using winch 6 to free a snowmobile from soft snow is best described as a 6-step process, having the following steps: orienting the snowmobile; attaching O-ring 14 to the snowmobile; attaching rope 8 to track 24; anchoring rope 8; applying power to the snowmobile; and disassembling winch 6. Each step in the process is described below.

Figure 2:
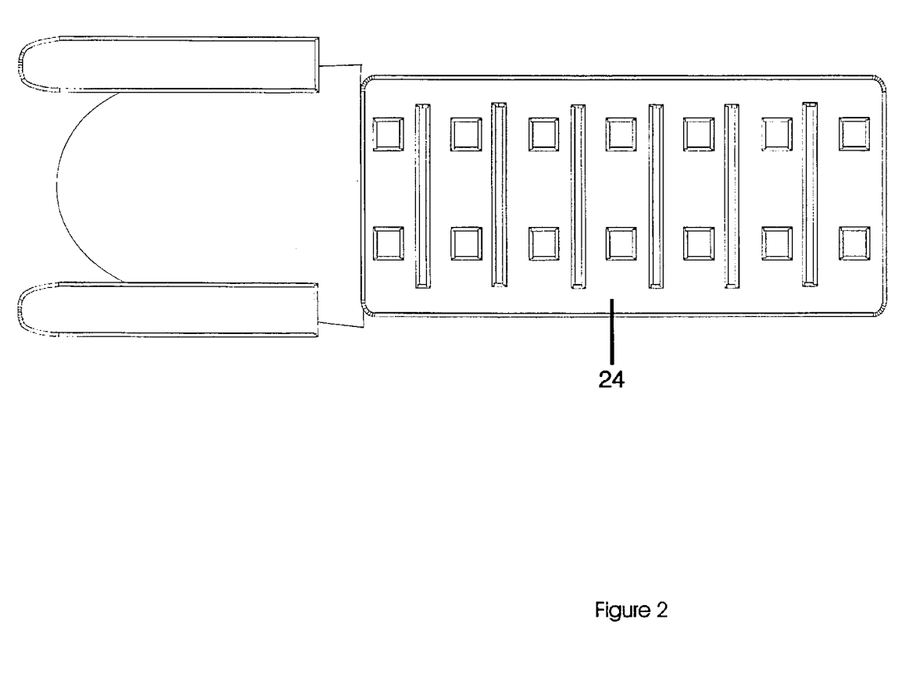
FIG. 2 is a side view of a typical snowmobile, with the snowmobile tipped on its side.
Figure 3:
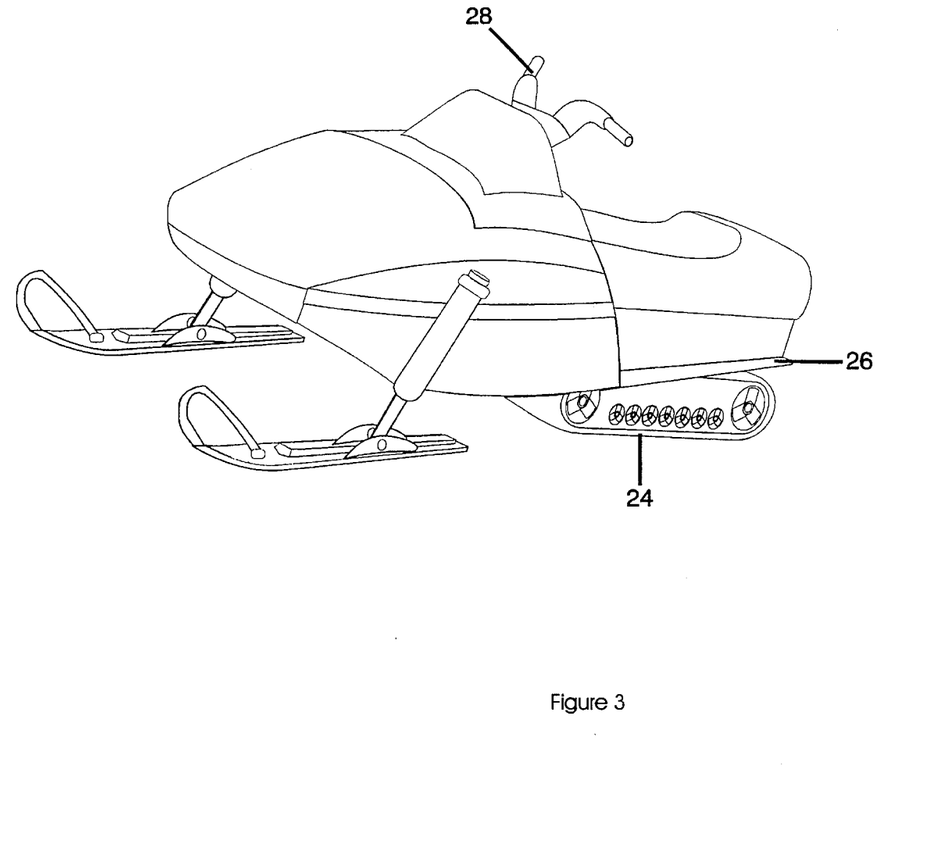
FIG. 3 is a perspective view of a typical snowmobile.

To orient the snowmobile, the snowmobiler first shuts off the engine, to prevent injury and to reduce the possibility of fire from a gas leak. The snowmobiler then tips the snowmobile on its side, exposing track 24, as shown in FIG. 2. FIG. 3 shows a typical snowmobile resting on its track 24. To tip the snowmobile on its side, the snowmobiler first stands on running board 26 and then reaches across the snowmobile to grasp hand grip 28. By pulling on hand grip 28 and leaning backward, the snowmobiler is able to pivot the snowmobile on the edge of its track 24; the snowmobiler's body weight provides the leverage necessary to tip the snowmobile farther on its side, exposing track 24. If strap 18A is not already looped through O-ring ear 16A, the snowmobiler feeds strap 18A through O-ring ear 16A, then repeats the process for strap 18B and O-ring ear 16B.

Figure 4:
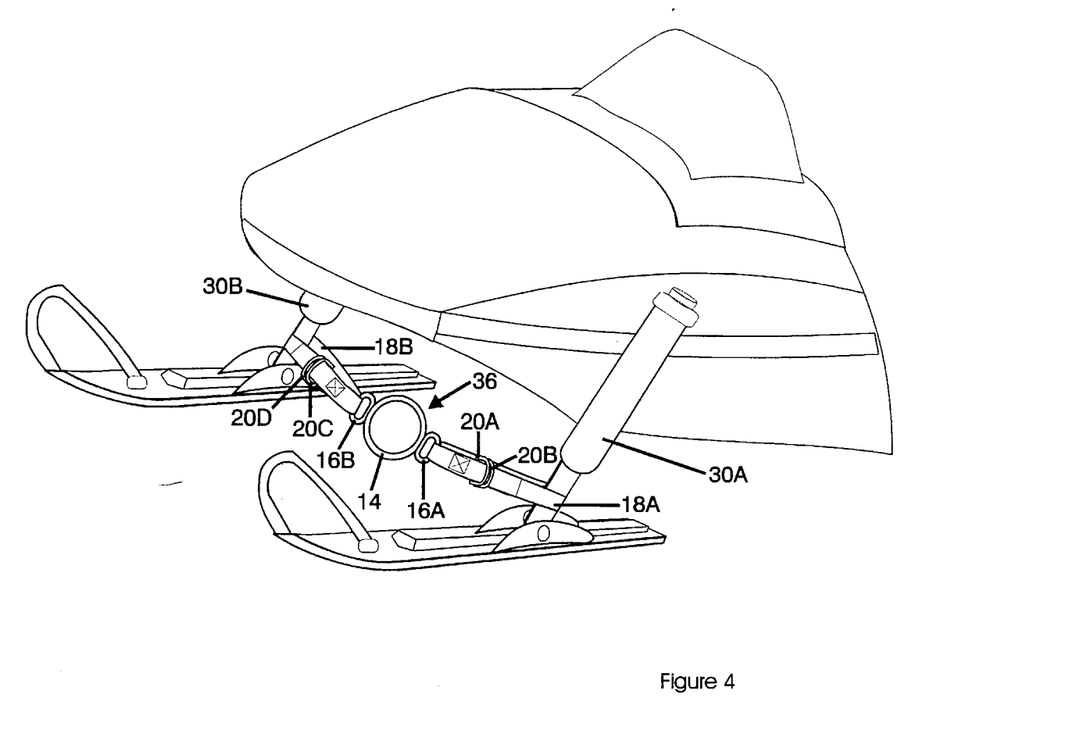
FIG. 4 shows the front end of a typical snowmobile, with part of the invention attached.

As is shown in FIG. 4, the snowmobiler next attaches centering harness 36 by looping strap 18A around a shock 30A on the snowmobile's front suspension. On some snowmobiles, because of differences in the design of the front suspension, the snowmobiler may loop strap 18A around a shock mount, not shown, or around some other solid and secure part of the front suspension. Once strap 18A is looped around shock 30A, the snowmobiler feeds six to eight inches of strap 18A through D-rings 20A and 20B.

The snowmobiler then loops strap 18B around a shock 30B and feeds approximately six to eight inches of strap 18B through D-rings 20C and 20D. Grasping the six to eight inches of strap 18A that lies exposed just beyond D-rings 20A and 20B, the snowmobiler pulls strap 18A until D-rings 20A and 20B clamp down on strap 18A, securing strap 18A to shock 30A. The snowmobiler then grasps the six to eight inches of strap 18B that lies exposed just beyond D-rings 20C and 20D, pulling strap 18B until D-rings 20C and 20D clamp down on strap 18B; in this fashion, strap 18B is secured to shock 30B.

The snowmobiler then centers O-ring 14 between shock 30A and shock 30B, by loosening either D-rings 20A and 20B, D-rings 20C and 20D, or both. Loosening the D-rings allows more or less of strap 18A, strap 18B, or both to be fed through the D-rings, thereby lengthening or shortening the straps. The purpose of centering O-ring 14 is to ensure that rope 8 wraps evenly around the center of track 24; this aspect of the process is discussed in greater detail below.

Figure 5:
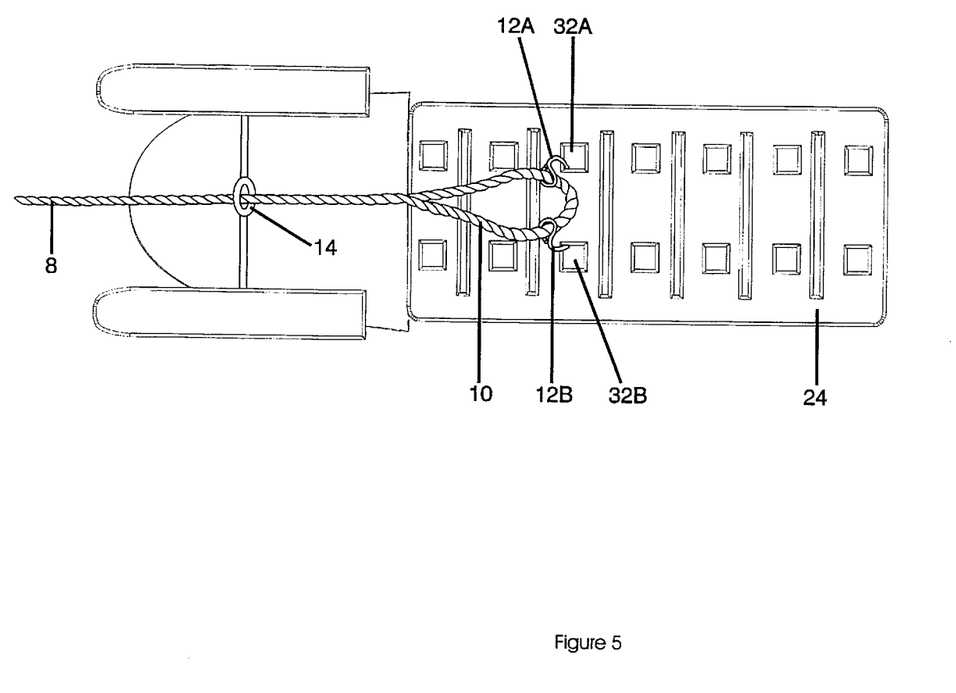
FIG. 5 is a side view of a typical snowmobile, with the snowmobile tipped on its side and part of the present invention attached.

As is shown in FIG. 5, the snowmobiler next passes loop 10 through O-ring 14 and carries loop 10 along track 24 to a point about one-third the way along the length of track 24. The snowmobiler then inserts the open end of S-hook 12A into a sprocket hole 32A, orienting S-hook 12A so that its closed end points toward the center of track 24. After inserting the open end of S-hook 12A into sprocket hole 18A, the snowmobiler inserts the open end of S-hook 12B into a sprocket hole 32B, orienting S-hook 12B so that its closed end points toward the center of track 24.

As is shown in FIG. 5, a row of sprocket holes runs along either side of a conventional snowmobile track. As a sprocket in the snowmobile's drive train engages these sprocket holes, the teeth of the sprocket push against the sprocket holes to rotate the track.

Each sprocket hole measures approximately 5 cm H by 7.6 cm W. Typically, on each sprocket hole the edges parallel to the front and back of the track are banded in metal, to reduce wear on the rubber track Along the length of the track, as shown in FIG. 5, the sprocket holes are spaced approximately 15 cm from one another. Across the width of the track, each sprocket hole is spaced approximately 23 cm from its mate on the other side of the track.

After laying rope 8 along the center of track 24, the snowmobiler tips the snowmobile off of its side and back onto track 24. The purpose of laying rope 8 along the center of track 24 is to ensure that rope 8 wraps smoothly and evenly around track 24. The snowmobiler next carries the working end of rope 8 (the end without S-hooks 12A and 12B) to a tree, a tree stump, a fence post, another snowmobile, or some other solid and secure object located on or nearby a groomed trail or other stretch of packed snow. The snowmobiler pulls rope 8 tight and ties it to the tree, a tree stump, a fence post, another snowmobile, or some other solid and secure object. Ideally, the snowmobiler ties off rope 8 with a timber hitch or similar knot; a timber hitch will hold a load without slipping, but will come loose easily when the strain is removed.

Figure 6:
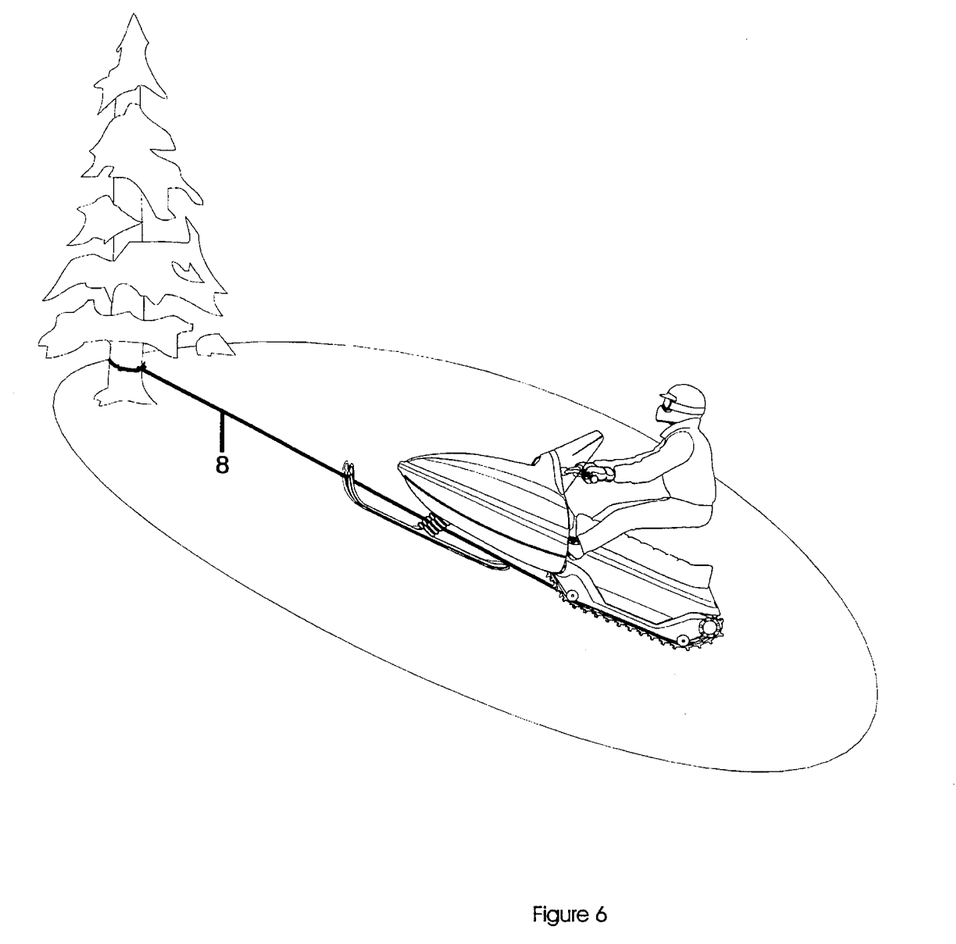
FIG. 6 is a perspective view of the invention in use to pull a snowmobile from soft snow.

After starting the engine, the snowmobiler applies power slowly and evenly to the snowmobile. As the snowmobiler applies power, track 24 begins to rotate. As track 24 rotates, sprocket holes 32A and 32B move toward the rear of the snowmobile, carrying S-hooks 12A and 12B with them.

With the working end of rope 8 firmly anchored to a tree, a tree stump, a fence post, another snowmobile, or some other solid and secure object, and with loop 10 anchored to track 24, track 24 pulls against the rope, propelling the snowmobile forward., thereby closing the relative distance between the snowmobile and the object to which rope 8 is anchored. In essence, the snowmobile crawls along the rope.

As the snowmobile begins to move forward, O-ring 14 keeps the rope centered between shock 30A and shock 30B, ensuring that rope 8 wraps smoothly and evenly around track 24 and diminishing the chance that rope 8 will become snagged on twigs, branches, rocks, or other obstacles.

To complete the process, the snowmobiler steers along rope 8 until reaching the groomed trail or other stretch of tracked snow, where the snow can once again support the weight of the snowmobile and where track 24 can once again gain traction on the snow. In some instances, the snowmobiler may need to steer along the rope no more than a few feet; thereafter, the snowmobile will be able to proceed without aid of winch 6.

To disassemble winch 6, the snowmobiler first shuts off the engine, again to prevent injury and to reduce the possibility of fire from leaking gas, and then tips the snowmobile onto its side. The snowmobiler removes O-ring 14 from shocks 30A and 30B by reversing the procedure described above. Next, the snowmobiler unties rope 8 from the tree or other object to which it is anchored.

Returning to the snowmobile, the snowmobiler unwraps rope 8 from track 24. Once rope 8 is unwrapped from track 24, the snowmobiler removes S-hooks 12A and 12B from sprocket holes 32A and 32B, respectively.

To use the winch to hoist a load, the snowmobiler first attaches the working end of rope 8, that is the end without S-hooks, to the load and then passes rope 8 over an elevated fulcrum point, such as a tree limb. Next, the snowmobiler inserts S-hook 12A into sprocket hole 32A and S-hook 12B into sprocket hole 32B. As the snowmobiler drives away from the load, the tensile member wraps around track 24, distributing the weight of the load evenly throughout track 24.

To use the winch to drag a load, the snowmobiler first attaches the working end of rope 8 to the load and then inserts S-hook 12A into sprocket hole 32A and S-hook 12B into sprocket hole 32B. As the snowmobiler drives away from the load, rope 8 wraps around track 24, pulling the load toward the snowmobile.

From the operational description above, a number of operational advantages of winch 6 should also become evident, including those described below.

Using winch 6 requires less physical strength and less physical exertion than repositioning the snowmobile, tramping a trail, or using a typical hand-held winch. In repositioning the snowmobile, the snowmobiler often has to lift over one hundred pounds from an awkward position and must often repeat this action numerous times, each time repositioning the skis of the snowmobile. In contrast, with winch 6 the snowmobiler uses the leverage provided by his or her body weight to tip the snowmobile onto its side to expose track 24—an action that must be done only twice. In addition, using winch 6 does not ordinarily require the snowmobiler to reposition the skis; in most instances, the skis will fall in the proper orientation when the snowmobiler tips the snowmobile back onto its track 24.

In tramping a trail, the snowmobiler must make numerous passes in the soft snow that lies between the snowmobile and a groomed trail or other stretch of packed snow. With winch 6, the snowmobiler must make only one trip from the snowmobile to a tree, a tree stump, a fence post, another snowmobile, or some other solid and secure object, and make only one trip back to the snowmobile.

To use a typical hand-held winch, the snowmobiler must possess substantial physical strength to operate the lever on the hand-held winch. In some cases, depending on the size of the hand-held winch and the weight of the snowmobile, the snowmobiler may be unable to exert enough pressure on the lever to pull the snowmobile forward. Using winch 6, the snowmobiler must possess only enough physical strength to tip the snowmobile onto its side, an action that is made relatively easy by the snowmobiler's ability to use body weight for leverage.

Because the snowmobiler expends less physical energy while using winch 6, the snowmobiler is less likely to become fatigued and is therefore less likely to suffer from hypothermia.

With winch 6, a snowmobiler spends less time digging in the snow and walking in the snow than he or she would while repositioning the snowmobile or tramping a trail. Less exposure to the cold and wetness of the snow reduces the likelihood that the snowmobiler will suffer from frostbite or hypothermia.

Because it requires the snowmobiler to make only one round-trip between the snowmobile and a tree or some other solid and secure object, using winch 6 is less time-consuming than either repositioning the snowmobile or tramping a trail. In repositioning the snowmobile, it is often necessary for the snowmobiler to repeat his or her actions many times. Similarly, in tramping a trail the snowmobiler must make enough passes between the snowmobile and a groomed trail or some other stretch of packed snow to ensure that the tramped trail is compacted sufficiently enough to support the weight of the snowmobile.

Winch 6 provides a method of freeing a stuck snowmobile that is more effective, efficient, and reliable than repositioning the snowmobile or tramping a trail. In both repositioning the snowmobile and in tramping a trail, the success of the method depends on the snowmobiler's ability to compact the snow sufficiently enough to support the weight of the snowmobile. Using winch 6 does not require that the snowmobile begin moving forward from a base of compacted snow, as does repositioning the snowmobile, nor does using winch 6 require that the snowmobile travel along a trail of packed snow, as is the case with tramping a trail. Rather, winch 6 pulls the snowmobile from the soft snow to a stretch of packed snow or to some other point at which the snowmobile can proceed without aid of winch 6.

To free a snowmobile from soft snow, winch 6 requires no power other than that provided by the snowmobile itself. This is not the case with a typical electrically powered winch, which requires power from a battery installed on the snowmobile.

In addition, winch 6 is safer to use than a typical electrically powered winch. A highly dangerous piece of equipment, a typical electrically powered winch generates a substantial amount of force and exerts substantial pressures on its steel cable. Among the most common injuries resulting from using a typical electrically powered winch are (1) injuries resulting from the cable breaking and then striking the snowmobiler and (2) injuries resulting from the snowmobiler's hands, feet, or clothing becoming entangled in the moving parts of the winch. In addition, the cable of a typical electrically powered winch terminates in an eye-hook or some other piece of metal hardware; if this hardware or the cable breaks, the hardware can become a projectile, causing serious injury if it strikes the snowmobiler or onlookers.

Using winch 6, a snowmobiler stands less of a chance of suffering the types of injuries described above. For one thing, winch 6 contains no moving parts in which the snowmobiler may get his or her hands, feet, or clothing entangled. When winch 6 is operating, the snowmobiler enjoys the same protections from the snowmobile's moving parts as he or she would enjoy while riding the snowmobile in an ordinary fashion.

In addition, the working end of rope 8 does not terminate in a piece of steel hardware, as is the case with a typical electrically powered winch; therefore, there is no hardware at the working end of rope 8 to become airborne and cause injury by striking the snowmobiler or onlookers.

Loop 10 does have some hardware attached: S-hooks 12A and 12B. However, S-hooks 12A and 12B are unlikely to fail, fracture, or shear because they are under stress only during the first revolution of track 24; thereafter, rope 8 and track 24 carry the load created by the rotation of track 24. Moreover, when winch 6 is operating, S-hooks 12A and 12B are most often located either beneath track 24 or beneath the seat of the snowmobile. For this reason, S-hooks 12A and 12B are unlikely to ever become airborne, even if they should fail, fracture, or shear.

Though using winch 6 places considerable stress upon rope 8, as using a typical electrically powered winch does upon its steel cable, the effects of rope 8 snapping can be reasonably expected to be less dramatic and therefore less dangerous than the effects of a steel cable snapping.

Using winch 6 requires little mechanical skill, unlike a typical electrically powered winch, which requires the snowmobiler or some other person to fabricate a mounting bracket or to purchase a mounting bracket and attach it and the winch to the snowmobile. Moreover, winch 6 requires no power other than that supplied by the snowmobile itself, doing away with the need for sufficient mechanical skill to install the battery required to use a typical electrically powered winch, or the mechanical skill necessary to connect a typical electrically powered winch to an existing battery.

Accordingly, the reader will see that winch 6 provides an effective, efficient, convenient, and reliable method of freeing a snowmobile from soft snow, using no power source other than that provided by the snowmobile itself. In addition, winch 6 provides a method of freeing a snowmobile that is: easy to use, requiring less physical strength and less physical exertion than is required by repositioning the snowmobile or tramping a trail and requiring less physical strength than is required to operate a typical hand-held winch; safe, placing the snowmobiler in less danger of injury than he or she would be in while operating a typical electrically powered winch; and fast, requiring the snowmobiler to spend less time digging in the snow, walking in the snow, or manipulating the snowmobile than if the snowmobiler were to reposition the snowmobile or tramp a trail.

Moreover, winch 6 itself offers a wide variety of advantages and benefits, in that it is: lightweight, weighing substantially less than either a typical hand-held winch or a typical electrically powered winch; small and compact, offering a snowmobiler greater flexibility in carrying and storing winch 6 than is offered by either a typical hand-held winch or a typical electrically powered winch; capable of operating in a greater number of situations and a wider variety of situations than either a typical hand-held winch or a typical electrically powered winch, owing primarily to the greater length of rope 8 over that of the steel cable supplied with either a typical hand-held winch or a typical electrically powered winch; simply designed, requiring no mounting bracket or modifications to the snowmobile and requiring little or no maintenance; and versatile, in that it may also be used to hoist a load from the ground or drag a load toward the snowmobile.

Although the description above contains many details and specificities, these should not be construed as limiting the scope of the invention but as merely illustrating some of the presently preferred embodiments of this invention. Winch 6 can be fashioned in a variety of ways, from a wide variety of materials that take on a wide variety of forms, shapes, and dimensions. Many of these variations are discussed above. Other variations include the following: modifying the working end of rope 8 so that it readily accepts additional lengths of rope, in order to increase the working length of winch 6; modifying the working end of rope 8 so that it attaches to a fixed object by means of attaching hardware, including such attaching hardware as eye-hooks, carabiners, and quick links; creating a rear-mount assembly similar to centering harness 36 or otherwise modifying winch 6 in order to pull a snowmobile equipped with a reverse gear backward through the snow; combining winch 6 with some device for lifting the snowmobile's track off of the ground, so that the suspended snowmobile remains stationary as track 24 turns, yet an object attached to the working end of rope 8 is drawn toward the snowmobile; forming rope 8 as a continuous loop in order to ferry objects between the snowmobile and some other point; using fixed points of rope 8 that are different from those of the preferred embodiment, that is, different from sprocket holes 32A and 32B and a tree, a tree stump, a fence post, another snowmobile, or some other solid and secure object; and tying rope 8 directly to track 24, without using a loop or any other attachment means.

Thus the scope of the invention should be determined by the appended claims and their equivalents, rather than by the examples given.

We claim:

1. A device for closing the relative distance between a track-driven snow vehicle and some other object, which device comprises:

a tensile member having a first end configured to removably attach to the track of the track-driven snow vehicle and wind thereon upon rotation of the track and having a second end configured to attach to the other object; and a guide configured to be removably attached to the track-driven snow vehicle for receiving and guiding the tensile member.

2. The device of claim 1 wherein the first end of the tensile member includes attachment means for removably attaching the tensile member to the track of the track-driven snow vehicle.

3. The device of claim 2 wherein the attachment means comprises a loop at the first end of the tensile member and an S-hook slidably attached to the loop.

4. The device of claim 3 wherein the guide is attachable to the track-driven snow vehicle by a pair of straps suspended between two separate points on the track-driven snow vehicle.

5. The device of claim 2 wherein the guide is attached to the track-driven snow vehicle by a pair of straps suspended between two separate points on the track-driven snow vehicle.

6. The device of claim 1 wherein the guide is attached to the track-driven snow vehicle by a pair of straps suspended between two separate points on the track-driven snow vehicle.

7. In combination with a snow vehicle having a track for the propulsion thereof, a winch device comprising:

a tensile member including a first end being configured to removably attach to the track of the snow vehicle and wind thereon upon rotation of the track and a second end configured to attach to a stationary object; and a guide configured to be removably attached to the snow vehicle for receiving and guiding the tensile member.

8. The device of claim 7 wherein the guide is attached to the snow vehicle by a pair of straps suspended between two separate points on the snow vehicle.

9. The device of claim 8 wherein the first end of the tensile member includes attachment means for removably attaching the tensile member to the track of the snow vehicle.

10. The device of claim 9 wherein the attachment means comprises a loop at the first end of the tensile member and an S-hook slidably attached to the loop.

11. The device of claim 10 wherein the first end of the tensile member includes attachment means for removably attaching the tensile member to the track.

12. The device of claim 11 wherein the attachment means comprises a loop at the first end of the tensile member and an S-hook slidably attached to the loop.

13. A method for freeing a stuck snow vehicle having a track for the propulsion thereof, comprising the steps of:

rotating a guide to the snow vehicle;

attaching a first end of a tensile member to the track of a snow vehicle;

engaging the tensile member with the guide;

attaching a second end of the tensile member to an object; and driving the track of the snow vehicle to wind the tensile member around the track to thereby close the relative distance between the snow vehicle and the object.

14. A method of lifting a load with a snow vehicle having a track for the propulsion thereof, comprising the steps of:

attaching a first end of a tensile member to the load;

attaching a centering apparatus to the snow vehicle;

suspending the tensile member over an elevated fulcrum point;

engaging the tensile member with the centering apparatus;

suspending the tensile member over an elevated fulcrum point;

attaching the second end of the tensile member to the track of the snow vehicle; and driving the track of the snow vehicle to wind the tensile member around the track.

15. The method of 14 further comprising the step of elevating the track.

16. A method of dragging a load with a snow vehicle having a track for the propulsion thereof, comprising the steps of:

attaching a first end of a tensile member to the load;

attaching a centering apparatus to the snow vehicle;

engaging the tensile member with the centering apparatus;

attaching the second end of the tensile member to the track of the snow vehicle; and driving the track of the snow vehicle to wind the tensile member around the track.

17. The method of 16 further comprising the step of elevating the track.

18. A device for closing the relative distance between a track-driven snow vehicle and some other object using a tensile member having a first end for removable attachment to the track of the track-driven snow vehicle and wind thereon upon rotation of the track and having a second end for removable attachment to the other object, which device comprises a guide configured to be removably attached to the track-driven snow vehicle for receiving and guiding the tensile member.

19. The device of claim 18 further comprising attachment means for removably attaching the first end of the tensile member to the track of the track-driven snow vehicle.

20. The device of claim 19 wherein the attachment means comprises a loop at the first end of the tensile member and an S-hook slidably attached to the loop.

21. The device of claim 20 wherein the guide is attachable to the track-driven snow vehicle by a pair of straps suspended between two separate points on the track-driven snow vehicle.

22. The device of claim 19 wherein the guide is attachable to the track-driven snow vehicle by a pair of straps suspended between two separate points on the track-driven snow vehicle.

23. The device of claim 18 wherein the guide is attached to the track-driven snow vehicle by a pair of straps suspended between two separate points on the track-driven snow vehicle.

* * * * *